United States Patent
Ver Nooy

[15] 3,665,966
[45] May 30, 1972

[54] PIPE PLUGGER
[72] Inventor: Burton Ver Nooy, Tulsa, Okla.
[73] Assignee: T. D. Williamson, Inc., Tulsa, Okla.
[22] Filed: Dec. 14, 1970
[21] Appl. No.: 98,149

Related U.S. Application Data
[63] Continuation of Ser. No. 808,078, Mar. 18, 1969, abandoned.

[52] U.S. Cl. .................................. 138/93, 73/49.6, 138/94, 138/97
[51] Int. Cl. ...................................................... F16l 55/12
[58] Field of Search ...................... 73/49.6, 49.8; 138/90, 93, 138/94, 97; 137/557

[56] References Cited
UNITED STATES PATENTS
2,327,615  8/1943  Ankarlo ............................. 138/94 X
2,927,609  3/1960  Vander Lans ....................... 138/94 X
3,154,106  10/1964  Ver Nooy .............................. 138/94
3,463,195  8/1969  Cooke .................................... 138/94

*Primary Examiner*—Carlton R. Croyle
*Assistant Examiner*—Richard J. Sher
*Attorney*—Hyer, Eickenroht, Thompson & Turner

[57] ABSTRACT

A pipe plugger disclosed includes a sealing element that can be expanded inside the pipe to plug off a range of pipe diameters. The element is inserted into a pipe, relaxed and unexpanded, through an opening of uniform diameter. This allows pipe tapping equipment for cutting a side opening of one diameter to be used with a range of pipe sizes, which results in a considerable reduction in the equipment required to handle plugging operations in a variety of pipe diameters.

11 Claims, 7 Drawing Figures

Patented May 30, 1972

Burton VerNooy
INVENTOR

BY Browning, Hyer
Eickenroht & Thompson

ATTORNEYS

Burton VerNooy
INVENTOR

Patented May 30, 1972
3,665,966
4 Sheets-Sheet 3
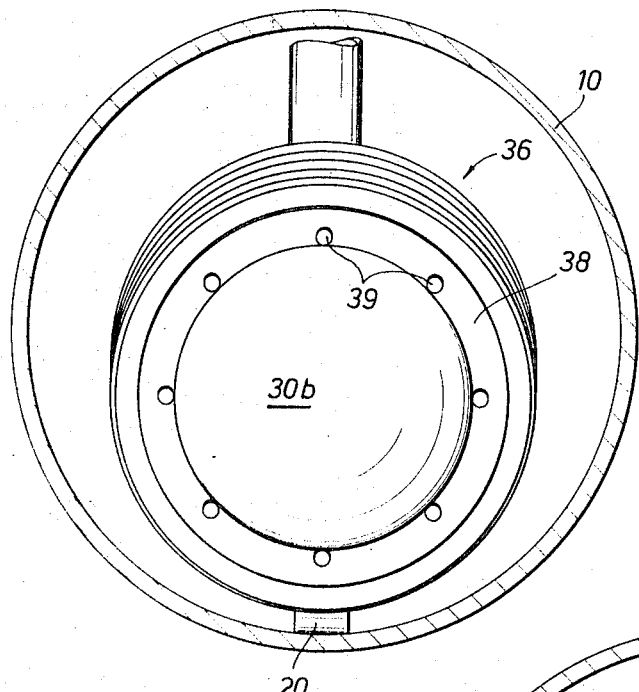
FIG. 3
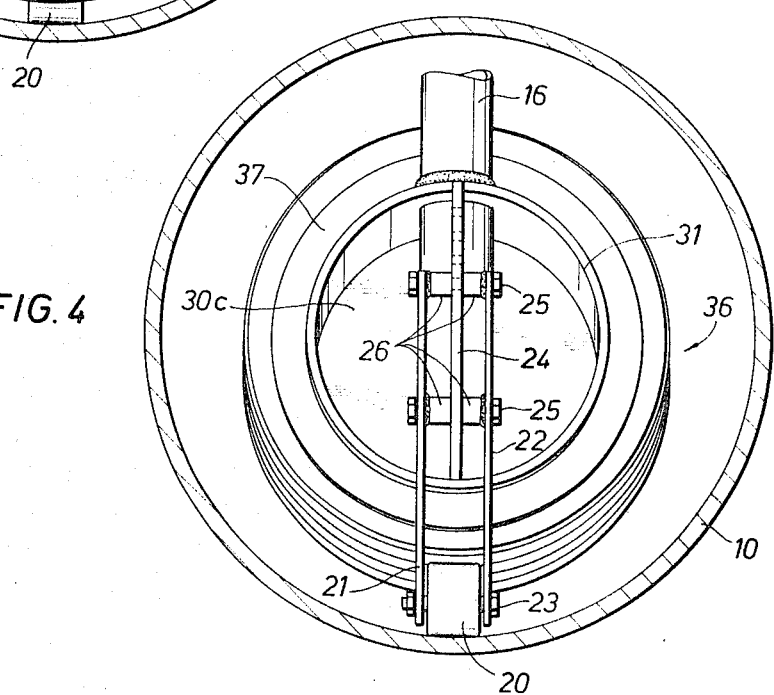
FIG. 4
FIG. 5
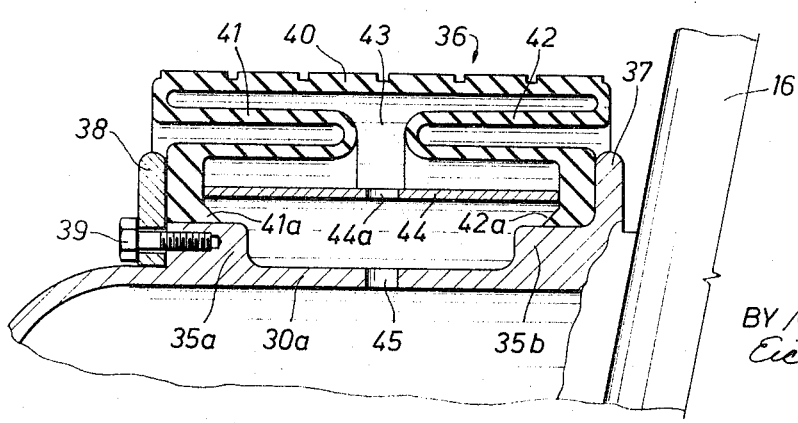
Burton VerNooy
INVENTOR
BY Browning, Hyer,
Eickenroht & Thompson
ATTORNEYS Patented May 30, 1972
3,665,966
4 Sheets-Sheet 4
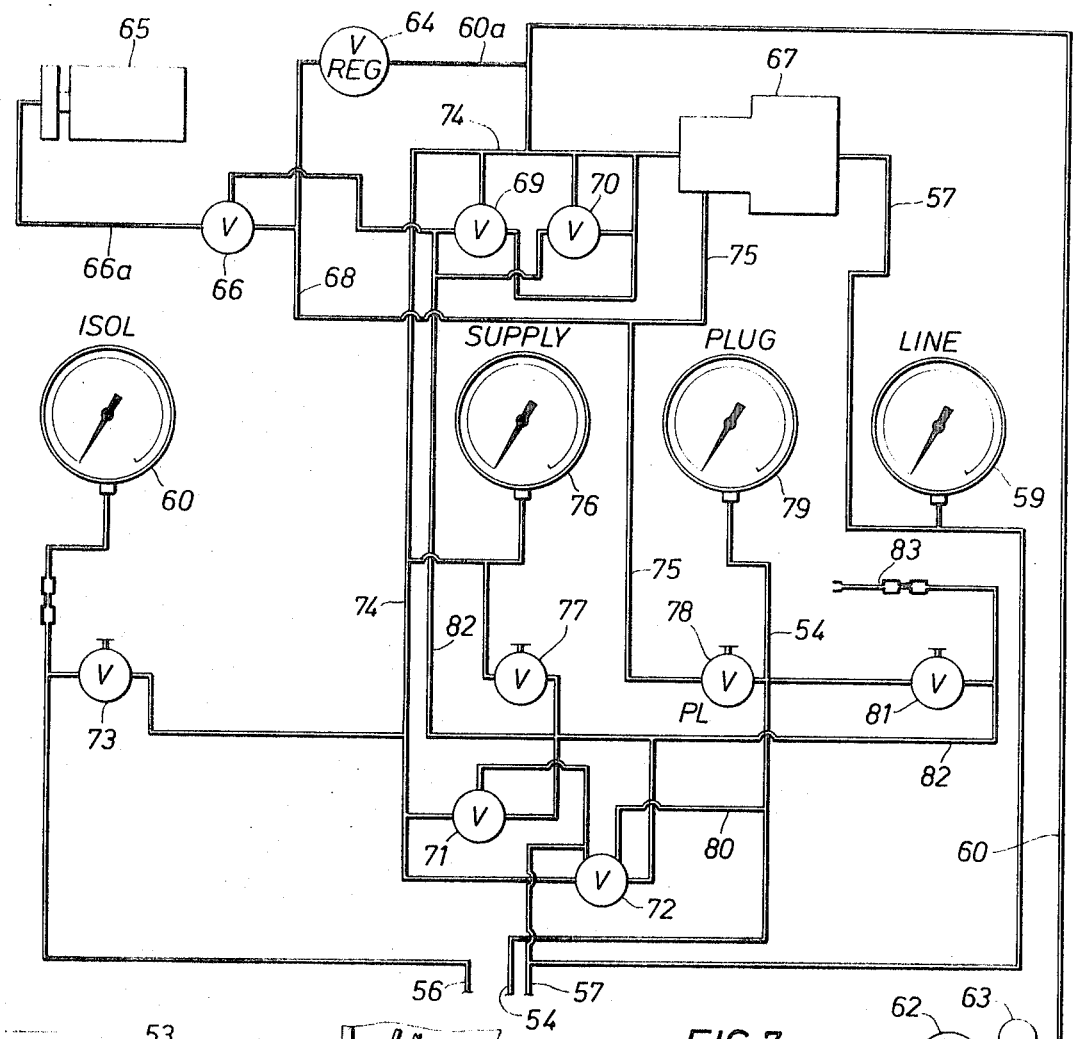
FIG.7
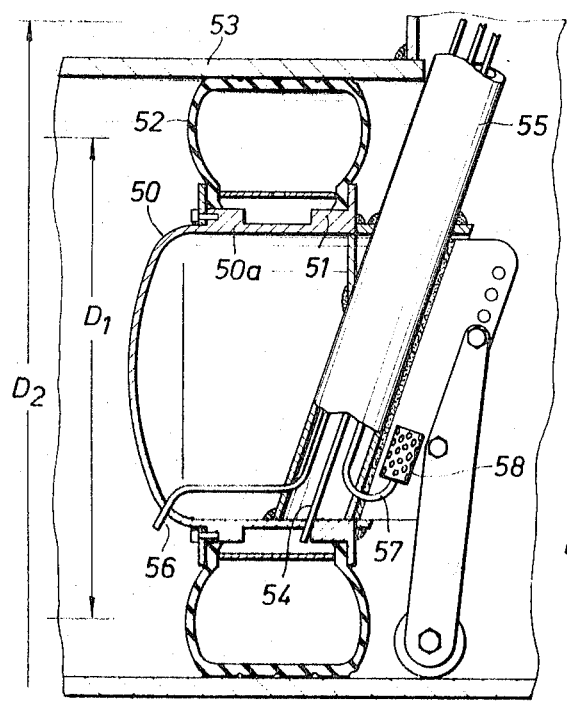
FIG.6
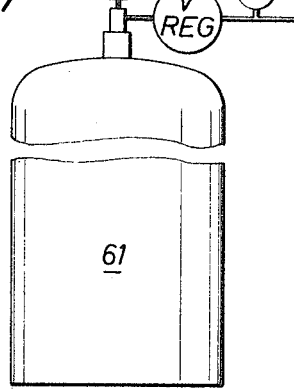
Burton VerNooy
INVENTOR
BY Browning, Hyer
Eickenroht & Thompson
ATTORNEYS

PIPE PLUGGER

This is a streamline continuation of application Ser. No. 808,078, filed Mar. 18, 1969, now abandoned.

This invention relates to a pipeline plugger of the type which in operation causes a plug means to move from a housing at one side of the pipeline through a side opening in the pipeline and then laterally along the pipeline to a seated position across the pipeline to one side of the side opening.

Pipeline pluggers of the type to which this invention relates have been extensively used to close off a section of the pipeline wherein it is desired to make certain changes. For example, if the pipeline should develop a leak, it is conventional to hot tap into the pipeline on either side of the leak and then to install a bypass loop around the section to be repaired. A split tee or nipple is then welded to the pipeline on either side of such section between it and the junctures of the bypass loop with the pipeline. A tapping valve is attached to the tee, a hot tapping machine is mounted on the tapping valve, and the tapping machine operated to tap into the pipeline. After the line has been tapped via the cutting of an opening in the side of it by the tapping machine, the tapping valve is closed and the tapping machine dismounted from the valve. A plugger is then mounted on the tapping valve. The valve is opened and the plugger operated to advance the plug into the pipeline through the side opening and into position to form a fluid barrier therein to one side of the opening. This practice not only permits continuing use of the pipeline while it is being repaired, but it also avoids the necessity of draining long sections of the pipeline to the nearest block valves on either side of the leaking section to make the repair.

There are other uses for pipeline pluggers that are well known to those skilled in the art and that need not be described.

Pipeline pluggers of the general type described above, i.e., those involving the seating of a plug means to one side of a side opening in a pipe, are disclosed in U.S. Pat. Nos. 2,906,295, 2,812,778, and 3,025,885. The pipeline pluggers disclosed in these patents, while operating very effectively require a different plug means for each different diameter pipe. The plug means they use is designed for one particular size pipe and will not operate effectively in a larger or smaller diameter pipe. This requires a large inventory of pipe pluggers to cover the complete range of pipe sizes. Further, each size plugger requires a side opening to be cut in the pipe that is large enough in diameter to pass that particular size plug means. As a result, a tapping machine adapted to cut a different size hole is usually required for each different pipe size. A tapping valve is used with each tapping machine and the plug means must pass through the valve into the pipeline. Thus, usually, a different size valve is also required for each different size pipe.

It is an object of this invention to provide a pipeline plugger having plug means that can pass through a side opening of uniform diameter and seal off a range of pipeline sizes. This means that for each range of pipeline sizes that the pipeline plugger of this invention will seal, only one size hot tapping assembly need be available. This reduces considerably the inventory of plug means and hot tapping equipment that must be kept on hand to anticipate all pipeline plugging needs in an area.

It is another object of the invention to provide a pipeline plugger having plug means that is easily unseated and removed from the pipeline, when the need for the plugger has ended.

It is yet another object of this invention to provide a pipeline plugger having plug means with a sealing element that can adapt itself readily to pipe that is out of round or that is undersized or oversized.

It is a further object of this invention to provide a pipeline plugger having an inflatable sealing element on the plug means that will expand to sealingly engage the inside of a range of pipeline sizes and which will return to approximately its original diameter upon deflation to permit the plug means to pass deflated into and out of pipe within the range of diameters for which it is designed, through an opening in the pipeline of uniform diameter.

It is a further object of this invention to provide such a pipeline plugger that includes means for controlling the pressure in the inflatable element on the plug means such that the plug means will maintain an adequate seal against the inside surface of the pipeline even though the pressure in the pipeline varies.

It is a further object of this invention to provide a pipeline plugger that includes means for cleaning the area of the pipeline that the sealing element on the plug means will contact prior to inflating the sealing element to move it into sealing engagement with the pipeline.

These and other objects, advantages, and features of this invention will be apparent to those skilled in the art from a consideration of this specification, including the attached drawings and appended claims.

In the drawings:

FIG. 3 is a front view of the plug means of FIG. 1, taken along line 3—3 of FIG. 1;

FIG. 4 is a rear view of the plug means of FIG. 1, taken along line 4—4 of FIG. 1;

FIG. 5 is a cross sectional view, on an enlarged scale, through the inflatable sealing element on the plug means;

FIG. 6 is a cross section view through an alternate embodiment of the pipeline plugger of this invention showing the plug means in sealing engagement with the inside of a pipeline; and FIG. 7 is a schematic view of a control panel for use with the alternate embodiment of FIG. 6 of this invention.

Figure 1:
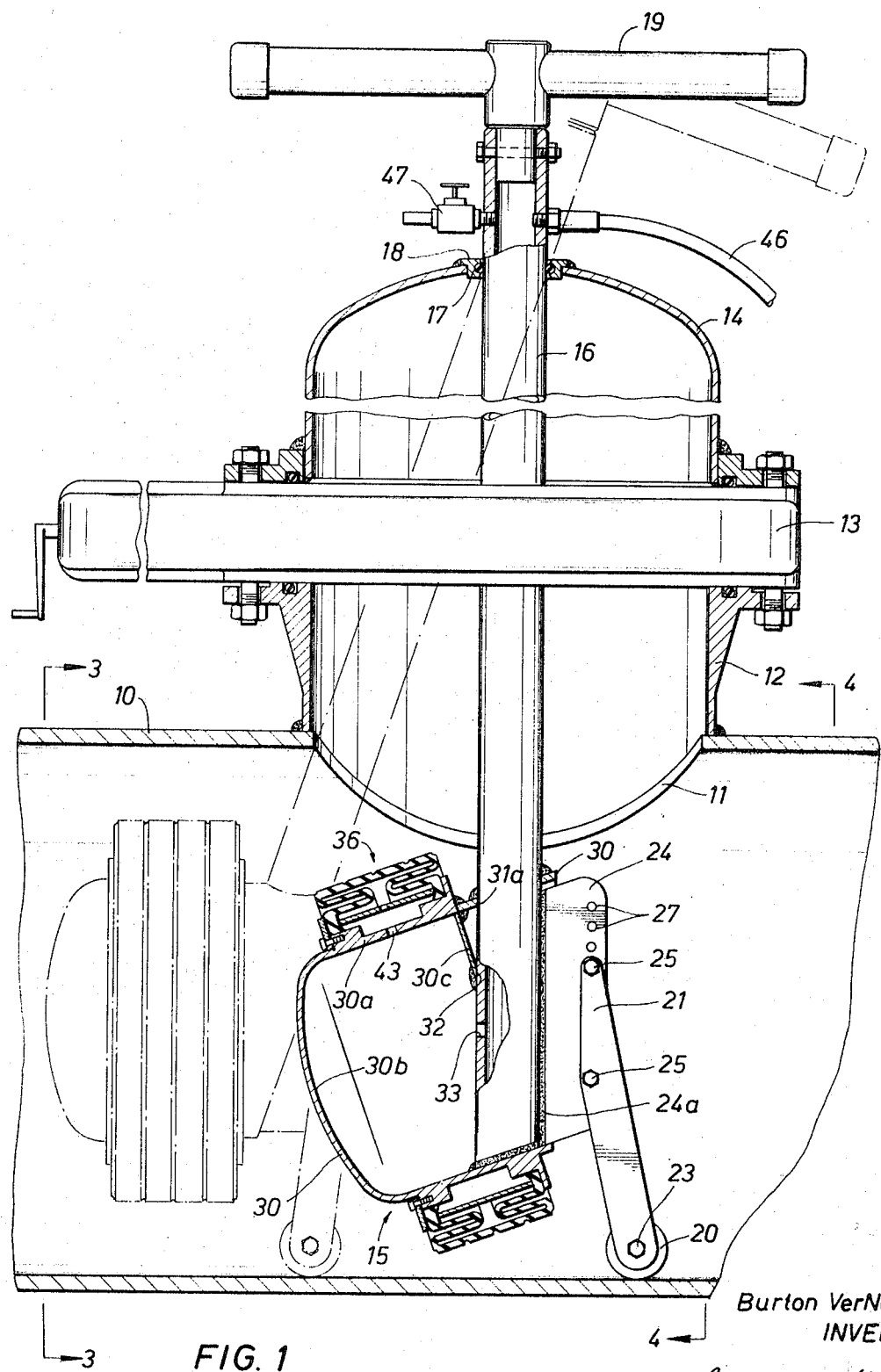
FIG. 1 is a cross sectional view through a section of pipeline in which a side opening has been cut with one embodiment of the plug means of this invention inserted in a pipeline through a side opening and positioned to one side of the side opening ready for its seal means to be inflated into sealing engagement with the pipe, the latter position being shown with dashed lines.

In FIGS. 1–5, pipeline 10 has been tapped, i.e., side opening 11 has been cut in the line by a hot tapping machine (not shown) in the usual manner. Before tapping the line, nipple 12 is welded to the side of the pipeline. Valve 13 is mounted on nipple 12 by flange connections as shown. The hot tapping machine was mounted on top of valve 13 and after cutting side opening 11 in the pipeline it was removed to allow the pipeline plugger to be mounted on top of valve 13.

The pipeline plugger includes housing 14 into which plug means 15 can be located when valve 13 is closed. Support rod 16 is attached to plug means 15 and extends out of housing 14 to allow manual manipulation and location of the plug means in pipeline 10. O-ring seal 17, located in bushing 18 at the top of the housing, provides a fluid tight sliding seal between support rod 16 and the housing. Handle 19 attached to the outer end of the rod facilitates the positioning and orientation of plug means 15 in the pipeline. The plug means and support rod provide a plug assembly.

Figure 2:
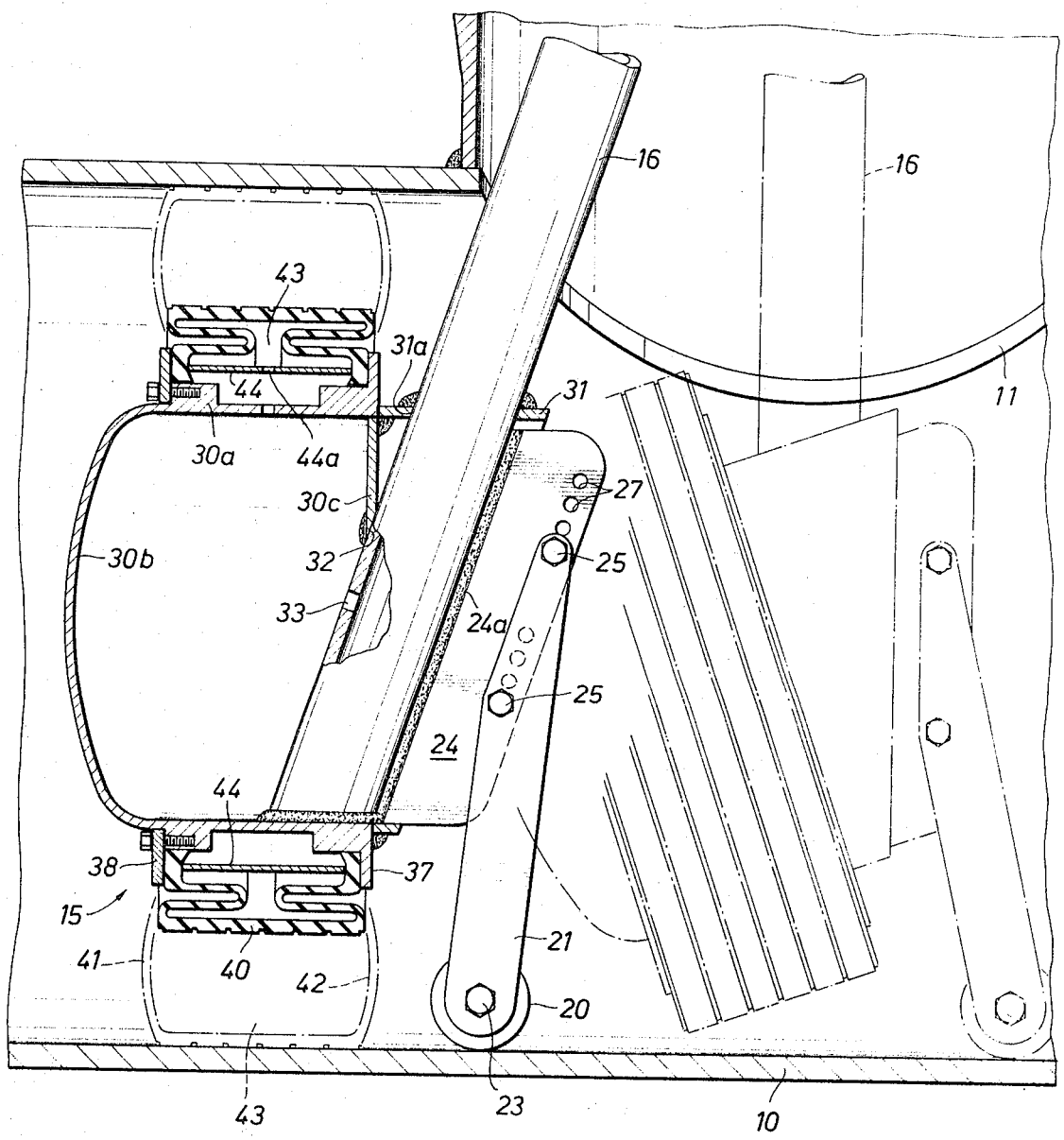
FIG. 2 is a view similar to FIG. 1 with the plug means shown in position for inflation in solid lines and in the inflated position at about its maximum diameter in dotted lines.

After plug means 15 is lowered through opening 11 in the side of the pipeline, it is moved longitudinally along the axis of the pipeline to one side of opening 11 to the position shown dotted in FIG. 1 and solid in FIG. 2. Roller 20 is provided to engage the inside of pipeline 10 and at least partially support some of the weight of plug means 15 as it is moved longitudinally along the pipe. The roller is rotatably mounted between plates 21 and 22 (FIG. 4) on bolt 23 which serves as an axle for the roller. Plates 21 and 22 are bolted to mounting bracket 24 by bolts 25. Spacers 26 are positioned on bolts 25 on each side of mounting bracket 24 to hold the plates the desired distance apart to accomodate roller 20.

Mounting bracket 24 is connected to support rod 16 by weld 24a. Plates 21 and 22 can be moved vertically relative to mounting bracket 24 to locate roller 20 to engage pipe having inside diameters within the range for which the pipeline plugger is designed to plug. Mounting holes 27 in mounting bracket 24 allow such adjustments.

Plug means 15 include hub 30, which has a cylindrical side wall 30a, a dished or spherically shaped front wall 30b and a flat rear wall 30c. As best seen in FIGS. 2 and 4, mounting ring 31 is welded to and forms an extension of side wall 30a. It is also welded to rear wall 30c. The control rod extends through opening 31a on the top side of mounting ring 31 and through opening 32 in rear wall 30c of the hub. This positions a portion of control rod 16 within the area confined by the walls of hub 30 to permit communication to be established between the inside of control rod 16 and the inside of hub 30 through port 33 in the wall of the control rod. The rod is welded to ring 31 and side 30c adjacent the openings through which it passes. It is also welded at its lower end to side wall 30a.

Radially extending flanges 37 and 38 are attached to cylindrical wall 30a of hub 30 to combine with wall 30a and provide a rim for supporting seal member 36 on the hub. Side wall 30a has spaced, annular sections 35a and 35b of increased diameter. Flange 37 is integrally attached to annular section 35b. Flange 38 is removably attached to annular section 35a by bolts 39.

Seal member 36 includes annular stretchable sealing section 40, made of elastomeric material, such as rubber, and flexible side walls 41 and 42. The outer edges of the flexible side walls are connected to the ends of sealing section 40 of the seal member. The inner edges of the side walls are in engagement with annular sections 35a and 35b of side wall 30a and flanges 37 and 38. Rim flanges 37 and 38 hold the inner edges of side walls 41 and 42 from moving laterally apart when the sealing element is subjected to an internal pressure. Pressure energized lip seals 41a and 42a are integrally attached to the inner edges of the side walls of the seal member and form a seal between side walls 41 and 42 and sections 35a and 35b, respectively, to maintain the pressure in the sealing element, when it is inflated. Annular ring 44 of relatively rigid material, such as steel, encircles hub 30 and extends between side walls 41 and 42. The ring holds the side walls against flanges 37 and 38 of the rim with lip seals 41a and 42a in position to form seals with portions 35a and 35b.

Sealing section 40 and side walls 41 and 42 of the sealing element cooperate with the rim and hub to form closed, pressure tight, annular chamber 43. Sides 41 and 42 are flexible and may be made of an elastomeric material similar to that used for sealing section 40. In the preferred embodiment, the walls fold under sealing section 36, as shown in FIG. 5, when the sealing section is in its relaxed or unstretched condition. For a complete description of a tire and a method of making the tire that can be used as the sealing element, see U.S. Pat. No. 3,347,300, which issued on Oct. 17, 1967, entitled "Tire" and U.S. Pat. No. 3,347,964, which also issued Oct. 17, 1967 and is entitled "Method and Apparatus for Making a Pneumatic Tire." In operation, the plug means is positioned in the pipe as shown in FIG. 2 in solid lines after passing through opening 11. Pressure fluid is forced through the hollow central portion of support rod 16, through opening 33, and into annular chamber 43 of sealing member 36, through one or more ports 45 in side wall 30a of the hub and openings 44a in rings 44. As this pressure fluid enters chamber 43, it will force sealing section 40 to expand radially and increase its diameter until it engages the inner wall of pipeline 10 and forms a seal therewith, as shown dotted in FIG. 2.

The sealing section can be moved outwardly only a limited distance, determined by how far side walls 41 and 42 will permit it to move out. This distance determines the maximum pipe diameter in which each particular sealing element can be used. The minimum diameter with which a sealing element can be used is the one that provides just enough clearance to permit the plug means, which includes the sealing element, to be positioned inside the pipe. In the range of pipe diameters between the minimum and maximum, the plug means can be used with the same size control valve 13, and pass through the same diameter opening 11, which means that only one size pipe tapping machine and cutter need be on hand for the particular plug means being used. As explained above, this results in a tremendous savings in inventory of valves and cutters and simplifies the hot plugging operation.

Pressure fluid may be supplied to inflate sealing element 36 from any convenient source. The amount of pressure used should be kept below the bursting pressure of the element. One convenient method of doing this is to use a commercial nitrogen bottle with a pressure regulator which can be connected directly to support rod 16 through flexible hose 46. A bleed valve 47, connected into the support rod can be used to bleed off the pressure, when the plugging operation is over. The pressure regulator permits the pressure in the seal means to be accurately controlled.

Nitrogen is suggested as the pressure fluid because it is inert and will not create an explosive condition when used to inflate the plugger in gas, oil, or hydrocarbon product lines. The pressure in seal means 36 must be maintained greater than the pressure in the pipeline. Generally, it is recommended that the pressure in the seal means be about twice what it is in the pipeline. This insures a good positive seal, but the pressure differential between the seal means and the head in the pipeline can drop below that and an adequate seal maintained.

An alternate embodiment of this invention is shown in FIGS. 6 and 7. FIG. 7 shows the control panel for the plug means of FIG. 6. The plug means is of the same general construction as plug means 15 described above. In FIG. 6, sealing element 52 of the plug means is shown inflated and in sealing engagement with the inside surface of pipe 53. Pressure fluid, preferably an inert gas, is supplied to the inside of the sealing element through tube 54. This tube extends through support rod 55 and passes through side 50a of the hub into the inside of sealing element 52. A seal is provided between the hub and tube 54, where the tube passes through the hub.

Also passing downwardly through support rod 55 are tubes 56 and 57. Tube 56, as will be explained in more detail below, is provided to blow away debris, loose scale, etc., that may be on the inside of the pipe, prior to inflating sealing element 52. Tube 57 is connected to filter 58 and to gage 59 on the control panel of FIG. 7. The tube connects gage 59 to the pipeline upstream of the plug means so gage 59 will indicate upstream or line pressure. Line 56, which is used for cleaning purposes before the sealing element is inflated, is also connected with gage 60 on the control panel. This gage will indicate downstream pressure when tube 57 is not being used for cleaning.

In operation, this embodiment is controlled by the panel as follows. Pressure fluid is supplied to the panel through supply line 60. This pressure fluid is preferably a gas, such as nitrogen or some other inert gas. The gas may be supplied from pressure bottle 61 through regulator 63 at the desired pressure, for example 50 psi. Pressure gage 63 is just downstream of regulator 62 to allow the regulator to be adjusted and monitored.

At the control panel, branch 60a supplies gas to regulator 64. Regulator 64 drops the pressure of the supply gas to something less than what it is when it reaches the control panel. The gas at this lower pressure is supplied to warning whistle 65 through pilot valve 66 and line 66a. The gas downstream of regulator 64 is also connected to the pressure proportionator 67 by line 68.

Incoming supply gas in line 60 is supplied directly to pressure proportionator 67, pilot valves 69 and 70, 71 and 72. Supply gas is also connected directly to push valve 73. These valves and the pressure proportionator are connected to the supply gas by line 74 and lines branching therefrom.

Pilot valve 69 is set to open if supply pressure to it drops below a predetermined amount. When it opens it will supply operating gas to valve 66, which opens this valve and actuates warning whistle 65 to indicate that the supply pressure has dropped below the predetermined desired amount. In the same way, control valve 70 is arranged to do the same thing and open valve 66 and blow the warning whistle, should the input pressure exceed a predetermined amount. These two pilot valves then will give a warning indication, when the supply pressure varies more than is desired.

Pressure proportionator 67 is adjusted to maintain a preselected ratio between the pressure of the input gas and the pressure of the gas flowing from the proportionator through line 75. The ratio that the proportionator maintains is that of supply pressure to upstream gas pressure in the pipeline the magnitude of which is supplied to the proportionator through line 57. Supply gage 76 is connected directly to supply gas line 74 and indicates the pressure of the supply gas. Push button valve 77, when opened by manually pushing down on the push button, will allow supply gas to flow through line 82, open pilot valve 66, and allow gas to flow from line 60a and regulator 64 to operate whistle 65. This allows manual control of the warning device as required to signal other people working on the pipeline at a location remote from the control panel, if such is desirable.

When the tapping valve, such as valve 13 of FIG. 1, is opened after the pipeline has been tapped, gage 59 will indicate pipeline pressure. Line 57 is also connected to pilot valve 71. Pilot valve 71 is set to open at a preselected pressure. This pressure should be the maximum pressure that the plugger can hold for the given size line. By setting pilot valve 71 at this pressure, when line pressure is supplied to it through line 57, if the line pressure is too high, it will open pilot valve 71 and supply gas to open pilot valve 66 and again blow warning whistle 65.

Output line 75 from proportionator 67 is connected to line 54 through push button valve 78. The output of the proportionator then is supplied to sealing element 52 of the plugger by manually opening push button valve 78. If prior to inflating sealing element 52, it is anticipated that loose dirt or chips may be present that could create a problem and make it difficult for the sealing elements to form a seal with the pipeline, they can be removed by opening push button valve 73. Gas will flow into line 56 from supply line 74 and direct a blast of air downwardly against the walls of the pipeline as the plug is moved into position. This jet of air will tend to flush out the bottom of the pipeline and remove loose debris. When push button valve 73 is closed then gage 60 indicates downstream pressure in the pipeline, when the sealing means has isolated the pipeline into upstream and downstream portions.

When sealing element 52 is inflated, the pressure in the sealing element is indicated by gage 79, since this gage is connected directly to line 54. The pressure in line 54 is also connected to pilot valve 72 through line 80. In addition, line 54 is connected to the pilot of whistle operating valve 66 through push button valve 81 and line 82. Downstream of valve 81 is vent 83, which is restricted so that the flow therethrough is retarded somewhat. With this arrangement, should the pressure in the sealing element and line 54 drop to a predetermined level, then pilot valve 72 will open supplying gas to open pilot valve 66 and blow warning whistle 65. Conversely, if push button valve 81 is opened, either deliberately or inadvertently, it will operate the warning whistle. Push button valve 81 will, of course, be used to bleed pressure off when it is time to deflate the sealing element and allow it to return to its original unstressed, relaxed diameter.

Preferably, pressure proportionator 67 is set to maintain the pressure in line 75, its output pressure, at twice the upstream pressure contained in line 57. Therefore, when the control panel is operating properly, gage 79 should read twice the pressure indicated on gage 59. Usually the line downstream is depressurized after the plug is set so gage 60 will indicate no pressure after the plug is set and the line bled down. Supply pressure is indicated on gage 76 and when any of the pressures vary too greatly or beyond the predetermined ranges, warning whistle 65 will indicate something needs to be checked.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipeline plugger for plugging pipelines having a range of diameters, said plugger being of a type having plug means insertable into pipelines within said range of diameters through an opening in the side of the pipeline, said plugger comprising a housing mountable at one side of the pipe to provide a fluid tight closure for said opening, a control rod slidably extending into said housing with a portion of the rod extending outside the housing so that said rod may be manually manipulated externally of the housing, a plug means attached to said rod inside said housing for movement by the rod from the housing through said opening in the side of the pipeline, and then longitudinally in the pipeline to a position to one side of the opening, said plug means including a hollow hub having a cylindrical side wall, a seal member having an annular stretchable sealing section of elastomeric material and flexible side walls connected to said sealing section of said seal member, so that said side walls may be folded to a minimum diameter as the seal member is inserted through the side opening in the pipeline and unfolded to allow the sealing section of the member to move outwardly to a diameter substantially greater than said opening when it is moved through said opening and to one side thereof in said pipeline, radially extending rim flanges extending from said side wall of said hub for holding the inner edges of said seal member side walls from movement laterally apart when said seal member is subjected to an internal pressure, an annular ring of relatively rigid material encircling said hub and extending between said seal member side walls for holding said seal member side walls adjacent said flanges so that the side walls will be in position to move into sealing engagement with the radially extending rim flanges when the sealing member is subjected to an internal pressure, a bracket attached to said control rod, roller means carried by the bracket for engaging the inside of the pipeline and at least partially supporting the weight of the plug means as it is positioned in the pipe by manipulation of said control rod, said roller being adjustably mounted on said bracket for assisting in the positioning of said plug means in pipes within the range of diameters the plugger will seal, means to supply pressurized fluid for inflating said seal member to force said sealing section into sealing engagement with pipe having inside diameters from a size enough larger than the unstretched sealing section to allow the sealing means to be positioned therein to a size such that the sealing section engages the pipe just before reaching the maximum diameter its flexible side walls permit it to reach.

2. A pipe plugger for a range of pipe sizes, said plugger being of the type with a plug means insertable into a pipe from a pressure-tight housing mounted at one side of the pipe through a side opening in the pipe, said plugger comprising plug means and a support rod connected to the plug means and extendable into said housing for moving the plug means from the housing through the side opening into the pipe and then longitudinally therein to a position in the pipe to one side of the opening, said plug means including a central hub, an annular seal member with an annular, stretchable, sealing section of elastomeric material mounted on the hub, and flexible, side walls, the outer edges of which are connected to opposite ends of the sealing section and the inner edges of which are in sealing engagement with the hub to form with the hub and the sealing section an enclosed pressure-tight annular chamber, said side walls being folded when the sealing section is relaxed, and means holding the inner edges of the side walls of the member against movement axially of the hub, whereby pressure fluid forced into the annular chamber will unfold the side walls and then stretch the sealing section and force the sealing section outwardly into sealing engagement with pipe having inside diameters that range from being just enough larger than the unstretched sealing section to allow the seal member to be positioned therein to pipe having an inside diameter such that the sealing section engages the pipe just before reaching the maximum diameter the side walls of the sealing section permit it to reach, said means holding the inner edges of said side walls of said annular seal member against movement axially including first and second rim flanges extending radially from said hub, said first rim flange being removably attached to said hub so that said annular seal member can be easily installed, and an annular ring of relatively rigid material encircling said hub and extending between said inner edges of said side walls in order to hold said side walls against said rim flanges.

3. A pipe plugger of the type having plug means insertable through a side opening in a pipe, comprising a plug assembly including plug means, and a support rod connected to the plug means for moving said plug means through said side opening into the pipe and then longitudinally therein to a position in the pipe to one side of said opening, said plug means including a central hub and an outwardly inflatable sealing member surrounding the hub to form an annular pressure chamber therewith, means for supplying pressure fluid to said annular chamber when said plug means has been moved to its position in the pipe to one side of the pipe opening so as to inflate said sealing member into sealing engagement with said pipe, a roller, and means mounting the roller on the plug assembly for engaging the bottom side of the pipe so as to locate the deflated plug means generally centrally of the pipe as said plug means is moved to one side of the pipe opening, said mounting means including means for adjusting the position of the roller in a direction radially of the outer periphery of the plug means.

4. A pipe plugger, comprising a housing mountable on one side of a pipe to provide a fluid-tight closure about an opening into the pipe, plug means including a central hub and an outwardly inflatable sealing member surrounding the hub to form an annular pressure chamber therewith, a support rod extending sealably through the housing and connected to the plug means for moving the plug means from within the housing through the opening in the pipe and then longitudinally within the pipe to a position to one side of said opening, means providing a passageway through the portion of the rod which extends sealably through the housing, means on said rod through which pressure fluid may be introduced into the passageway from a source of pressure externally of the housing, and means connecting the passageway within the housing with the pressure chamber so that said pressure fluid may be introduced into said chamber for inflating said sealing member into sealing engagement with the pipe to one side of said opening.

5. A pipe plugger of the character defined in claim 4, wherein said hub includes walls enclosing same, and said passageway connecting means connects the passageway with the enclosed hub and the enclosed hub with said annular chamber.

6. A pipe plugger of the character defined in claim 4, including means providing a second passageway through the portion of said rod extending through the housing, and means connecting said second passageway within the housing with one side of the plug means.

7. A pipe plugger of the character defined in claim 6, including means externally of said housing for sensing the pressure of fluid within the second passageway and indicating when it exceeds a predetermined level.

8. A pipe plugger of the character defined in claim 6, including means externally of said housing for sensing the pressure of fluid in said second passageway and maintaining it at a predetermined level relative to the pressure of fluid in said first passageway.

9. A pipe plugger of the character defined in claim 6, including means providing a third passageway through said portion of the rod extending through the housing, and means connecting said third passageway within the housing with the other side of said plug means.

10. A pipe plugger, comprising a housing mountable on one side of a pipe to provide a fluid-tight closure about an opening into the pipe, a plug assembly including plug means including a central hub and an outwardly inflatable sealing member surrounding the hub to form an annular pressure chamber therewith, and a support rod extending sealably into the housing and connected to the plug means for moving the plug means from within the housing through the opening in the pipe and then longitudinally within the pipe to a position to one side of said opening, a source of pressure fluid externally of said housing, a conduit on the plug assembly for directing a stream of pressure fluid against the pipe ahead of the plug means as said plug means is moved into the pipe to one side of said opening, and means for introducing pressure fluid from said source externally of said housing into said conduit, so as to direct it against said pipe, and means for selectively discontinuing the introduction of said pressure fluid into said conduit, and instead introducing it into said annular chamber for inflating said sealing member.

11. A pipe plugger, comprising a housing mountable on one side of a pipe to provide a fluid-tight closure about an opening into the pipe, a plug assembly including a plug means including a central hub and an outwardly inflatable sealing member surrounding the hub to form an annular pressure chamber therewith, and a support rod extending sealably through the housing and connected to the plug means for moving the plug means from within the housing through the opening in the pipe and then longitudinally within the pipe to a position to one side of said opening, means through which pressure fluid may be introduced into said annular chamber for inflating said sealing member, means on the plug assembly for sensing the pressure in the pipe on at least one side of the plug means when said plug means is in sealing position across the pipe, and means for comparing the pressure of said pressure fluid and the sensed pressure of fluid in the pipe on said one side thereof and maintaining them at a desired level relative to one another.

* * * * *